United States Patent [19]

Rossman

[11] Patent Number: 4,671,693
[45] Date of Patent: Jun. 9, 1987

[54] TIMBER JOINT

[75] Inventor: Wendell E. Rossman, Phoenix, Ariz.

[73] Assignee: Ensphere Concept International, Inc., Phoenix, Ariz.

[21] Appl. No.: 703,410

[22] Filed: Feb. 20, 1985

[51] Int. Cl.⁴ .......................... F16B 11/00; E04B 1/32
[52] U.S. Cl. ................................... 403/174; 403/178; 403/260; 52/81
[58] Field of Search ............... 403/174, 178, 170, 217, 403/259, 260, 261, 164, 165, 258, 171, 176, 169, 232.1, 230; 52/81, 82, 80, 573

[56] References Cited

U.S. PATENT DOCUMENTS

| | | | |
|---|---|---|---|
| 1,853,991 | 4/1932 | Olesen | 403/259 |
| 1,975,384 | 10/1934 | Ahlborn | 403/178 |
| 2,223,215 | 11/1940 | Kunz et al. | 52/573 |
| 2,328,987 | 9/1943 | Martin | 403/174 |
| 2,389,171 | 11/1945 | Urdain | 52/573 |
| 3,486,278 | 12/1969 | Woods | 52/81 |
| 3,507,526 | 4/1970 | Packman et al. | 403/174 |
| 3,810,342 | 5/1974 | Scott | 403/173 |
| 3,986,316 | 10/1976 | Blodee | 403/176 |
| 4,244,152 | 1/1981 | Harper, Jr. | 403/217 |
| 4,491,437 | 1/1985 | Schwartz | 52/81 |
| 4,566,818 | 1/1986 | Schwartz et al. | 403/176 |

Primary Examiner—Cornelius J. Husar
Assistant Examiner—Peter M. Cuomo
Attorney, Agent, or Firm—Kenyon & Kenyon

[57] ABSTRACT

The improved joint connection provides a separate stress ring for each of the compressive loading zone and tensile loading zone at the end of a timber beam and a central stem secured to one ring and unsecured to the other ring. The connection is such that shrinkage in the timber beam along the major axis of the cross section can be accommodated by movement of the unsecured stress ring relative to the stem. A plate is provided at the end of the stem to retain the moveable stress ring in the joint connection.

In one embodiment, a pair of one-piece connectors can be secured at the end of each timber between the timber and the respective stress rings of the joint connection.

In another embodiment, a second pair of coaxial and concentric rings may be employed with the outer rings being of polygonal shape to have flat sides against which the respective beams may be secured.

In still another embodiment, the stress rings and stem may have a polygonal shape.

24 Claims, 6 Drawing Figures

TIMBER JOINT

This invention relates to a timber joint. More particularly, this invention relates to a joint connection for a timber beam construction.

As is known, various types of structures have been built using heavy timber members. In these cases, it has been known to interconnect the members at various joints via connections such as described in U.S. Pat. Nos. 4,484,430 and 3,810,342.

However, it has been found that heavy timber members, by nature, undergo changes in dimensions. In particular, timber beams of either the solid or of the glue-laminated type, tend to shrink Further, this shrinkage is greatest along the long dimension of the cross section of a timber beam. Thus, if a timber beam is fastened or connected to another structural member by a connector which is a rigid system, the beam, when shrinking, may develop one or more cracks at the central fiber area. These cracks are particularly detrimental since they occur at the plane of greatest shear, thus reducing the initial strength. In severecases, the beam may split along the entire length, resulting in potential structural failure.

In cases where tendons have been used in timber beams in order to connect the beam to a joint connection, the tendons have usually only resisted tensile stresses. Should a compressive stress be imposed by the joint connection onto the beam, the stress is transferred primarily through the end face of the beam rather than through the tendon.

Accordingly, it is an object of the invention to provide an improved joint connection for timber construction.

It is another object of the invention to accommodate the shrinkage of a timber beam in a joint connection.

It is another object of the invention to provide a relatively simple joint connection for timber beams.

It is another object of the invention to reduce the risk of cracking or splitting of a timber beam due to shrinkage at a joint.

Briefly, the invention provides a joint connection for a timber beam which is comprised of a pair of coaxially disposed stress rings, a stem which is coaxially disposed within the rings and which is secured to one ring while being movable relative to the other ring and means secured to an end of the stem adjacent the unsecured ring to project transversely from the stem in order to abut the unsecured ring coaxially thereon.

The joint connection can be used with a plurality of timber beams which extend radially of the joint connection with each beam being secured at one end to each of the stress rings. Should a timber beam shrink in a direction parallel to the stem after being erected in place, the unsecured stress ring will slide or move relative to the stem to accommodate this shrinkage. Thus, stressing of the end of the timber beam due to shrinkage can be eliminated.

The means which is secured to the end of the stem to retain the unsecured stress ring within the connection may be in the form of a plate which is integrally secured, as by welding, to the end of the stem. This plate may extend sufficiently to provide a seat for the unsecured stress ring. This seat may also be useful for erection purposes. Furthermore, the plate may be provided with an aperture for receiving a lifting mechanism.

In one embodiment, the joint connection is provided with two groups of connectors with each group secured to a respective stress ring in a radiating manner. In this case, each pair of coaxially disposed connectors are secured to the end of a timber beam with one connector in a compressive loading zone of the beam while the other is in a tensile loading zone of the beam. In this embodiment, at least one tendon extends longitudinally from each loading zone of each beam into the respective connector thereat while a means is provided to secure each tendon to the respective connection. In addition, a compression nut is provided on at least the tendon in the compressive loading zone in abutting relation with a respective connector and recessed within the end face of the beam in order to transmit a compressive stress from the connector into the beam.

In another embodiment, the joint connection includes a second pair of rings coaxially of and concentric to the first pair of rings as well as a plurality of stiffener plates which are radially disposed between and secured to a respective ring of each pair of rings. In this embodiment, the innermost rings may be of circular cross section while the outermost rings are of polygonal cross section. In this case, any suitable means may be used to secure a timber beam to the flat sides of the outermost pair of rings.

In still another embodiment, the rings of the joint connection may be of polygonal cross section so that each flat side of the pair of rings can be secured by suitable means to a respective timber beam.

These and other objects and advantages of the invention will become more apparent from the following detailed description taken in conjuction with the accompanying drawings wherein.

Figure 1:
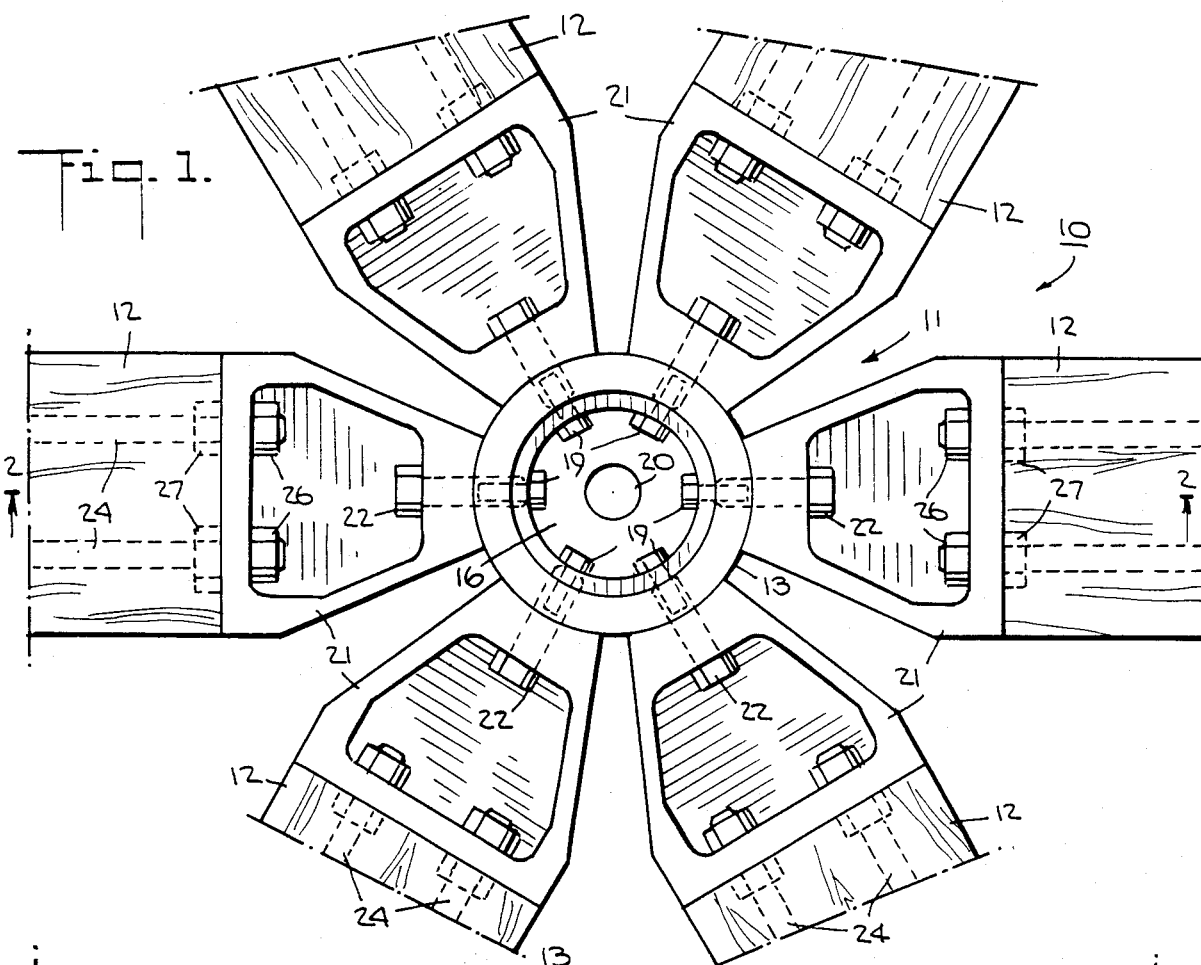
FIG. 1 illustrates a partial plan view of a timber joint constructed in accordance with the invention.
Figure 2:
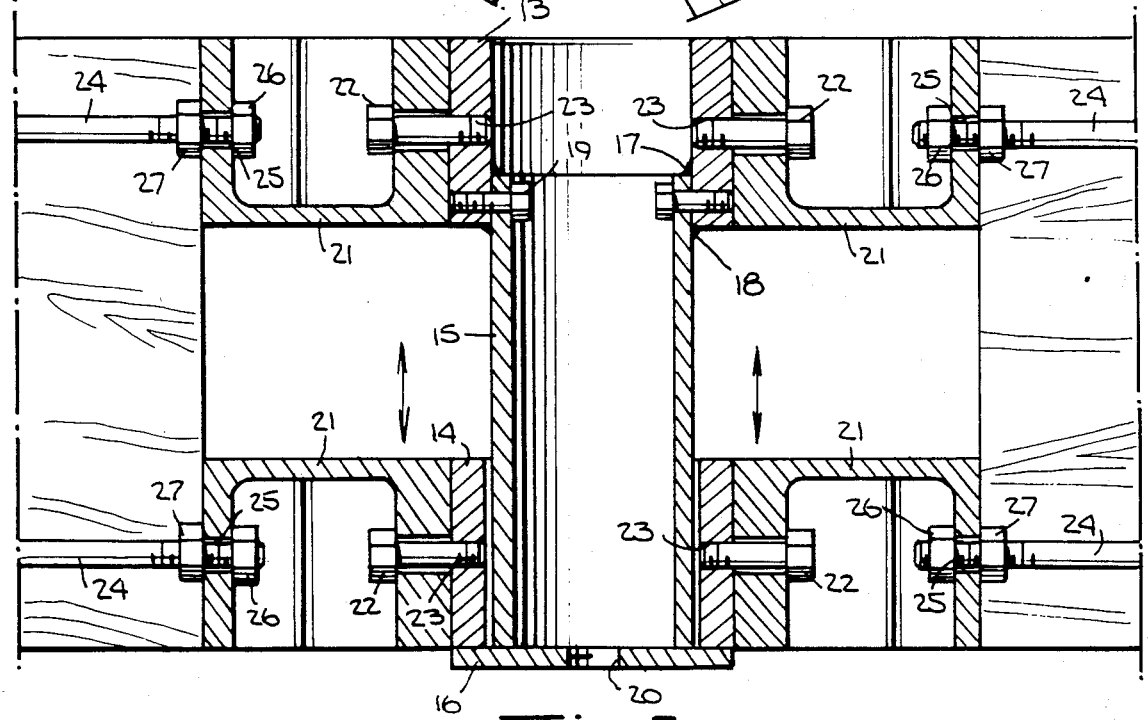
FIG. 2 illustrates a view taken on line II—II of FIG. 1.

Referring to FIGS. 1 and 2, a timber joint 10, for example in a space frame timber structure such as a reticulated shell, truss and the like is composed of a joint connection 11 and a plurality of timber beams 12 which extend radially of the joint connection 11.

The joint connection 11 includes a pair of coaxially disposed stress rings 13, 14, a stem 15 which is coaxially disposed within the rings 13, 14 and a means in the form of a plate 16 fixedly secured to one end of the stem 15 adjacent the lower stress ring 14, as viewed in FIG. 2.

The stem 15 is of hollow circular cross-section and is secured, as by welds 17,18, to the upper ring 13, as viewed. In addition, bolts 19 may also secure the upper end of the stem 15 to the stress ring 13.

The stem 15 is unsecured to the lower stress ring 14. To this end, the stress ring 14 is free to move along the peripheral surface of the stem 15, for example, vertically, as viewed in FIG. 2.

The plate 16 projects transversely from the stem 15 so as to form a seat against which the lower stress ring 14 may abut in coaxial manner as indicated in FIG. 2.

Each stress ring 13, 14 is of circular cross section while the lower stress ring 14 is provided with a slight clearance from the stem 15.

The plate 16 is secured in an integral manner, as by welding, to the lower end of the stem 15 and includes a central aperture 20 which may be threaded to receive a suitable lifting mechanism for erection purposes.

The joint connection also includes two groups of connector 21. Each of these connectors 21 may be constructed in a manner as described in U.S. Pat. No. 4,484,430. As indicated in FIG. 1, each connector 21 is of one piece construction and is of arrow head shape. Each connector 21 is also secured as by an anchor bolt 22 to a respective stress ring 13,14. In this regard, each ring 13, 14 may be provided with a threaded bore 23 to threadably receive a bolt 22.

Each timber beam 12 which may be of laminated construction has pairs of tendons 24 embedded therein, for example as described in U.S. Pat. No. 4,484,430 so as to extend longitudinally through and from the end face of the beam 12. One pair of tendons 24 extend from the compressive loading zone of the beam 12 while the second pair of tendons 24 extend from the tensile loading zone of the beam 12. As indicated in FIGS. 1 and 2, each tendon 24 extends through an unthreaded bore 25 in a respective connector 21. In addition, the end of each tendon 24 is threaded and is secured to each connector 21 by a suitable means such as a nut 26.

A compression nut 27 is also threaded onto each tendon 24 at the threaded end and is recessed within the beam 12. When threaded in place, each compression nut 27 is positioned to be in abutting relation with an end face of a respective connector 21 in order to transmit a compressive stress from the connector 21 into the beam 12.

The joint connection 11 may be supplied to the construction site independently of the timber beams 12. Further, the stem 15, stress rings 13,14 and plate 16 may be supplied as a single unit independently of the connectors 21.

For erection purposes, by way of example, a pair of connectors 21 may be secured to one or more timbers 12 which are then hoisted into place. Thereafter, the assembly of stem 15, rings 13, 14 and plate 16 can be hoisted into the place where a joint is to be formed and secured to one or more connectors 21 which are already at that place. Assembly can be readily effected by threading the bolts 22 through the tip end of each connector 21 into a respective stress ring 13, 14.

Of course, other techniques may be used for erecting the connection members of the joint.

Referring to FIG. 2, where the timber joint is oriented so that the timber beams 12 have compression loading zones at the upper ends, as viewed, and tensile loading zones at the lower ends, a compressive stress is transferred directly from the stress ring 13 through the upper group of connectors 21 and through the compression nuts 27 and tendons 24 into the beams 12. At the same time, a tensile stress can be transferred through the lower tendons 24, nuts 26 and the lower group of connectors 21 into the lower stress ring 14. Should any shrinkage occur in the timber beams 12, that is, in a vertical direction, as viewed in FIG. 2, the lower stress ring 14 is able to move upwardly along the stem 15 to accommodate the shrinkage. Thus, the beams may shrink without restraint so that cracking or splitting is avoided.

Of note, should the timber beams 12 experience different shrinkage rates or different degrees of shrinkage, the lower stress ring 14 may accommodate such by tilting slightly within the clearance range of the ring 14 from the stem 15. Should one beam tend to shrink to a much greater degree than the others, the stress created thereby may be transmitted via the stress ring 14 to the other beams 12.

Figure 3:
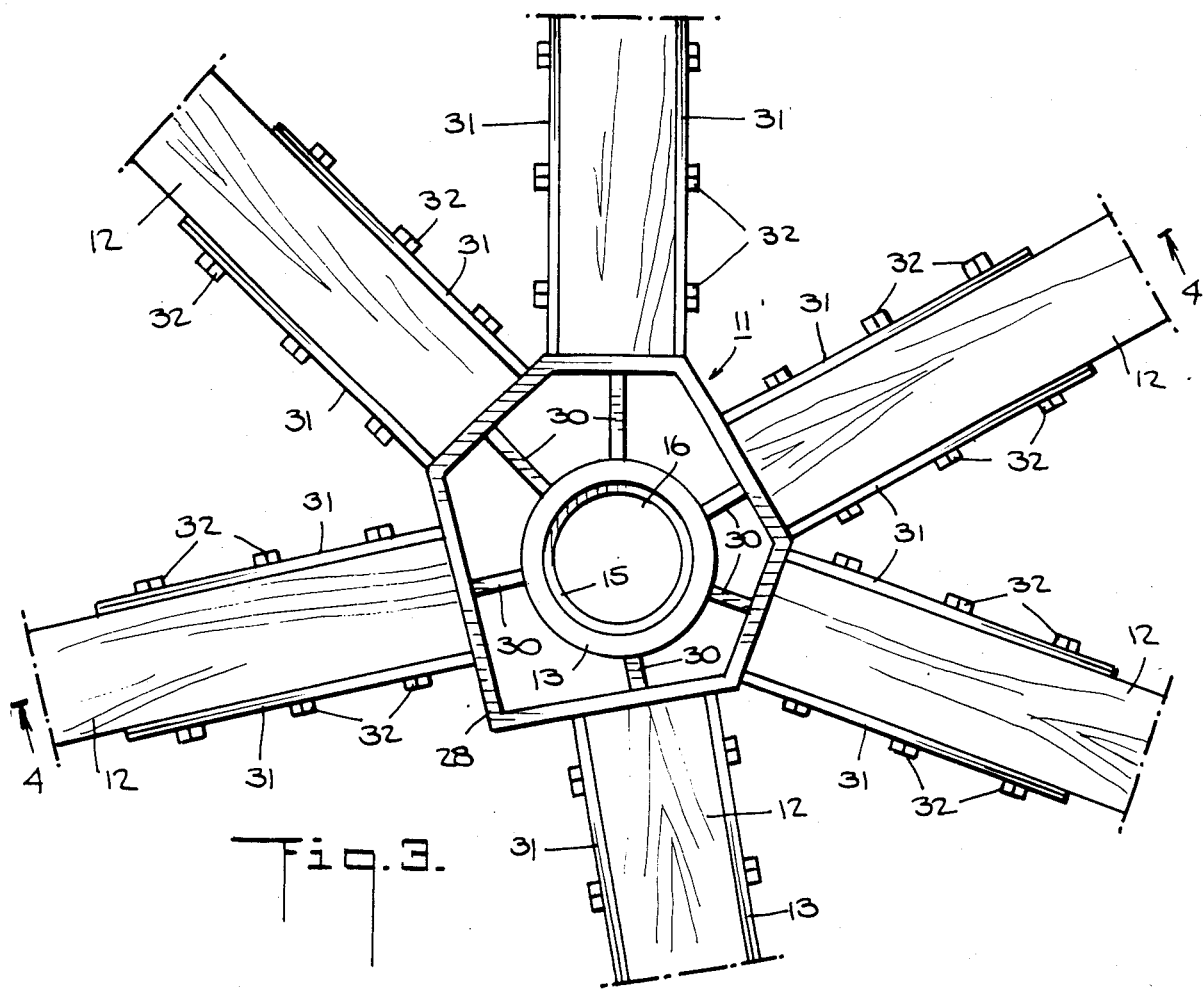
FIG. 3 illustrates a plan view of a modified timber joint in accordance with the invention.
Figure 4:
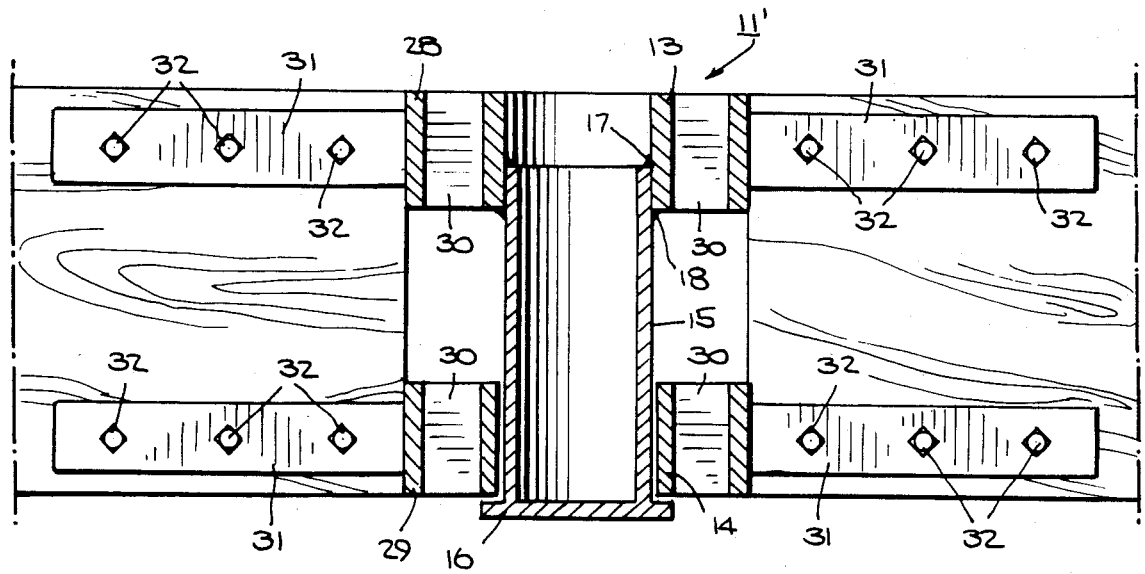
FIG. 4 illustrates a view taken on line IV—IV of FIG. 3.

Referring to FIGS. 3 and 4, wherein like reference characters indicate like parts as above, the joint connection 11' may be constructed to accommodate connection to timber beams 12 in a modified manner. To this end, the joint connection 11' has a second pair of rings 28, 29 disposed coaxially and concentrically to the stress rings 13, 14. In addition, stiffener plates 30 are disposed between the respective concentric rings 13, 28; 14, 29 and are secured to each, as by welding. In this case, the outer rings 28, 29 may be of a different shape from the inner rings 13, 14, for example, the inner rings 13, 14 may be of circular shape, as is the stem 15, while the outer rings 28, 29 may be of polygonal shape, that is with flat sides.

In this embodiment, each timber 12 carries pairs of steel plates 31 or the like on the side surfaces which are secured thereto as by bolts 32 which pass through the beam 12. These plates 31 may be secured to the flat sides of the outer stress rings 28, 29, as by welds (not shown) so as to form an integral connection.

Alternatively, the timbers 12 may have tendons which extend longitudinally therethrough by means of which the timbers 12 may be connected to the respective flat sides of the stress rings 28,29, for example in a manner as described above wherein the timbers 12 are secured to the connectors 21.

Figure 5:
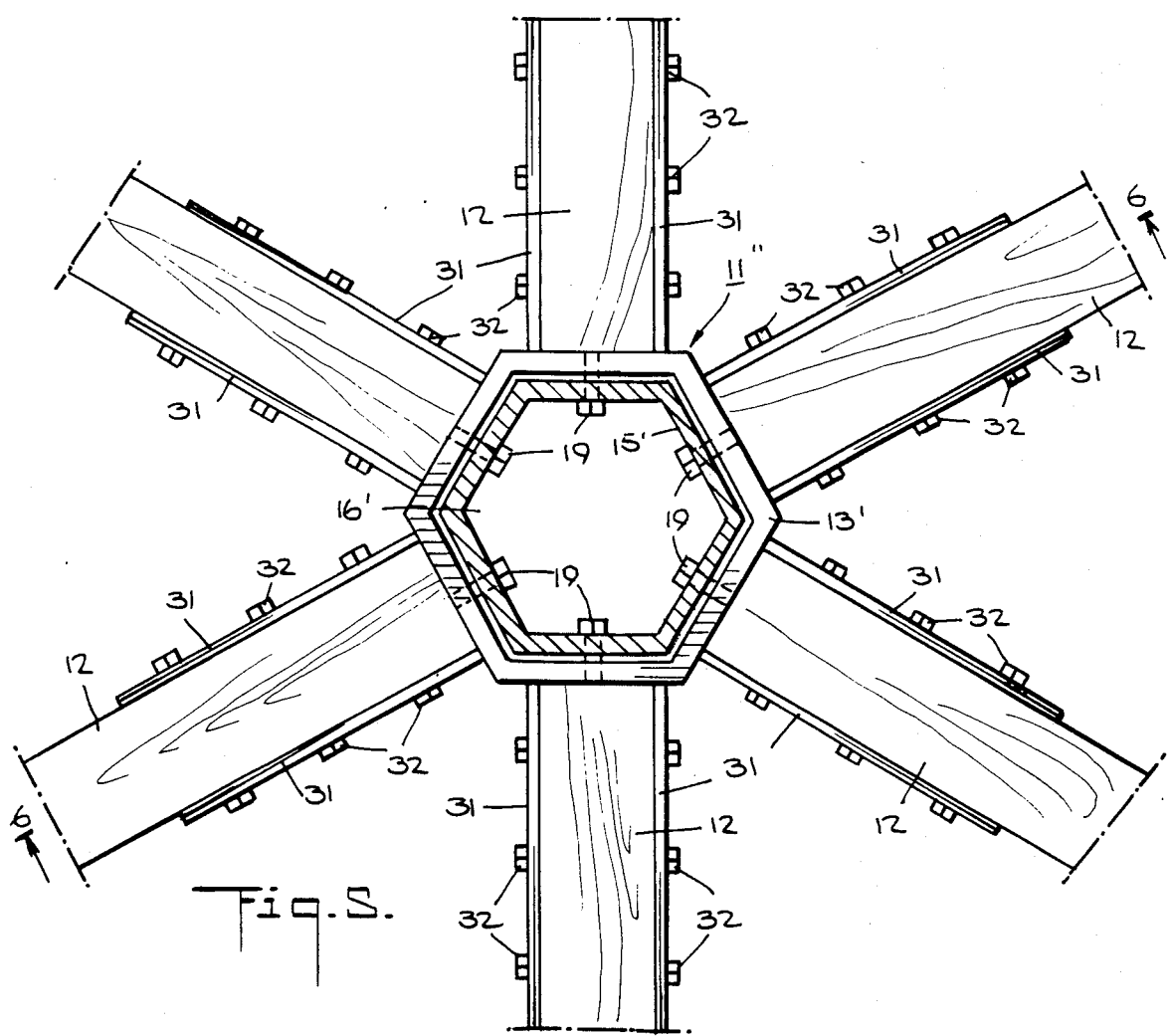
FIG. 5 illustrates a further modified timber joint in accordance with the invention.
Figure 6:
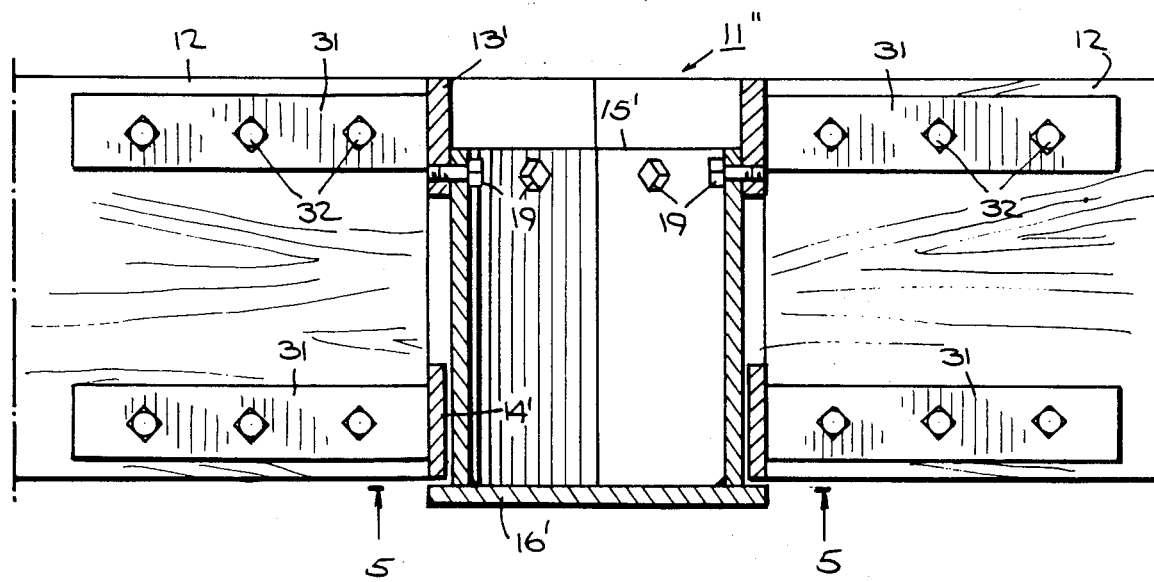
FIG. 6 illustrates a view taken on line VI—VI of FIG. 5.

Referring to FIGS. 5 and 6, wherein like reference characters indicate like parts as above, the joint connection 11" may be constructed with a stem 15' of polygonal cross section and stress rings 13', 14' also of polygonal cross section. In this case, the timber beams 12 may be of the type as described in FIGS. 3 and 4 and may be secured to the flat sides of the stress rings 13', 14' directly via the plates 31, for example by welding.

The connection members of the joint connection, for example, the stress rings and central stem may be made of any suitable material such as steel. Further, the stem 15 may be made of hollow tubing or of solid shafting. Further, the stem may be of any suitable cross sectional geometry with the stress rings associated therewith being of similar cross sectional shape.

The invention thus solves a problem of splitting of timber beams due to shrinkage by dividing the connection between the stress zones of the timber beam so that each zone may act independently in the major axis direction of the cross section of the timber beam.

Since, however, horizontal shear is generated due to bending within the joint connection, the two stress zone members, i.e. stress rings, are linked together by the third connection member, i.e the central stem. Since the stem extends from one stress zone connection member to the opposite stress zone connection member, the stem can resist horizontal shear within the entire joint connection.

The invention further provides for the transfer of a compressive stress from the joint connection into the timber beams which are constructed with longitudinally extending tendons. In this case, each compression nut can be threaded onto a respective tendon and leveled at a plane which provides for predetermined compressive resistance against the face of the nut. In this manner, part or all of the compressive stresses can be transferred into the beam through the tendon. For this purpose, the end of the beam is appropriately drilled out to receive the compression nut which is, together with the tendon, adhesively bonded into the beam end.

What is claimed is:

1. A joint connection for a timber beam comprising
a pair of coaxially disposed stress rings to be secured with an end portion of the timber beam;
a stem coaxially disposed within said rings, one of said stress rings being secured to said stem and the other of said rings being movable relative to said stem; and
means fixedly secured to an end of said stem adjacent said other ring and projecting transversely from said stem to abut said other ring coaxially thereof on a side opposite from said one ring.

2. A joint connection as set forth in claim 1 wherein said stem is welded to said one ring.

3. A joint connection as set forth in claim 1 further comprising at least one bolt securing said stem to said one ring.

4. A joint connection as set forth in claim 3 wherein said stem is of hollow circular cross section.

5. A joint connection as set forth in claim 4 wherein said means is a flat plate rigidly secured to and across said stem and having a aperture therein.

6. A joint connection as set forth in claim 1 wherein, said stem is of polygonal cross-section and each of said rings is of polygonal shape.

7. A joint connection as set forth in claim 1 further comprising a first group of connectors secured to and extending from said one ring in a radiating manner and a second group of connectors secured to and extending from said other ring in a radiating manner.

8. A joint connection as set forth in claim 1 further comprising a second pair of rings coaxial of and concentric to the first pair of rings; and a plurality of stiffener plates secured to one respective ring of said first pair of rings and one respective ring of said second pair of rings.

9. A joint connection as set forth in claim 8 wherein each of said rings of said second pair of rings is of polygonal cross-section.

10. In combination,
a joint connection including a pair of coaxially disposed stress rings and a stem disposed within said rings, said stem being secured to one of said rings and unsecured to the other of said rings; and
a plurality of timber beams extending radially of said joint connection, each of said beams having an end face secured to both of said rings whereby said other ring is allowed to move along said stem in response to shrinking of said beams relative to said stem.

11. The combination as set forth in claim 10 which further comprises a pair of connectors secured at said end faces of each of the beams one of said pair of connectors being secured to one of said rings and the other of said pair of connectors being secured to the other of said rings.

12. The combination as set forth in claim 10 wherein said joint connection further includes a second pair of rings coaxial of and concentric to the first pair of rings, and a plurality of stiffener plates radially disposed between and secured to one respective ring of said first pair of rings and one respective ring of said second pair of rings and wherein each beam is secured at one end to each of said second pair of rings.

13. In combination
a timber beam;
a first connection member secured to one end face of said beam in a compressive stress region thereof;
a second connection member secured to said end face of said beam in a tensile stress region thereof; and
a third connection member transverse to and in the planes of said first and said second connection members, said first connection member being secured to said third connection member to convey stress therebetween and said second connection member being movably disposed relative to said third connection member whereby said second connection member is free to move along said third connection member in response to shrinking of said timber beam relative to said third connection member.

14. The combination as set forth in claim 13 wherein said first connection member is a stress ring, said second connection member is a stress ring and said third connection member is a stem coaxially disposed within said rings.

15. The combination as set forth in claim 14 which further comprises a first group of connectors secured to and radially extending from one of said stress rings to said beam, a second group of connectors secured to and radially extending from the other stress ring to said beam, at least one tendon extending longitudinally from said beam into one of said first group of connectors and means securing each tendon to a respective connector.

16. The combination as set forth in claim 15 which further comprises a compression nut threaded on at least one of said tendons and recessed within said beam in abutting relation with a respective connector to transmit a compressive stress from said respective connector into said beam.

17. The combination as set forth in claim 14 which further comprises a plurality of radially disposed timber beams secured at each end thereof to each of said stress rings.

18. In combination,
at least two timber beams each having an end face and disposed in a co-planar relationship;
a first stress ring secured to and respectively between said end faces of said beams in a compressive loading zone of each beam:
a second stress ring secured to and respectively between said end faces of said beams in a tensile loading zone of each beam; and
a stem coaxially disposed within said rings, said one of said rings being secured to said stem and the other of said rings being movable along said stem to permit said other ring to move coaxially relative to said one ring in response to shrinkage of said beams.

19. The combination as set forth in claim 18 which further comprises a pair of connectors secured to said end faces of each respective beam, one connector of each pair of connectors being secured to said first ring and the other connector of each pair of connectors being secured to said second ring.

20. In combination
a timber beam having a recess in one end face thereof;
a tendon extending longitudinally through and from said one end face of said beam;
a connector mounted over said tendon and abutting a compressive loading zone at said end of said beam;
means securing said tendon to said connector; and
a compression nut on said tendon being received within said recess of said beam in an abutting relationship with said connector in order to transmit a compressive stress from said connector into said beam.

21. A joint connection as set forth in claim 1 wherein said rings are disposed in spaced relation to each other to permit movement of said other rings along said stem to accomodate shrinkage of a timber beam in a direction parallel to said stem.

22. A joint connection as set forth in claim 1 wherein each ring is an annular ring of circular shape.

23. A joint connection as set forth in claim 1 wherein each ring is of polygonal shape with flat sides.

24. The combination as set forth in claim 10 wherein said other ring is spaced from said one ring and is slidably mounted on said stem to accomodate shrinkage of each timber beam in a direction parallel to said stem.

* * * * *